United States Patent [19]
Lohman

[11] Patent Number: 5,526,397
[45] Date of Patent: Jun. 11, 1996

[54] SWITCHING TRANSCODER

[75] Inventor: Michael Lohman, Rockville, Md.

[73] Assignee: Hughes Electronics, Los Angeles, Calif.

[21] Appl. No.: 870,849

[22] Filed: Apr. 20, 1992

[51] Int. Cl.$^6$ .................................................. H04M 11/00
[52] U.S. Cl. ................................ 379/58; 379/59; 370/118
[58] Field of Search ................................ 379/58, 59, 63, 379/60; 370/118, 109, 110.4; 375/8, 122; 381/2, 34, 35; 155/72, 33.1, 33.2

[56] References Cited

U.S. PATENT DOCUMENTS

| | | | |
|---|---|---|---|
| 4,742,514 | 5/1988 | Goode et al. | 370/109 |
| 5,146,609 | 9/1992 | Tayloe et al. | 455/33.2 X |
| 5,195,091 | 3/1993 | Farwell et al. | 379/60 X |
| 5,299,198 | 3/1994 | Kay et al. | 455/33.1 X |

Primary Examiner—Curtis Kuntz
Assistant Examiner—G. J. Oehling
Attorney, Agent, or Firm—Gordon R. Lindeen, III; Wanda K. Denson-Low

[57] ABSTRACT

The present invention switch transcoder (18) provides transcoding of speech for a cellular system in which speech from a plurality of E1 lines (7) may be compressed for outputting to a much smaller number of T1 lines (8) so that multiple conversations greater in number than previously possible can be carried on at the same time. The transcoding and switching of speech between the E1 and T1 lines are effected on a single module (30) which has thereon the control processor (42), voice processors (44) and appropriate interfaces (36, 40).

17 Claims, 7 Drawing Sheets

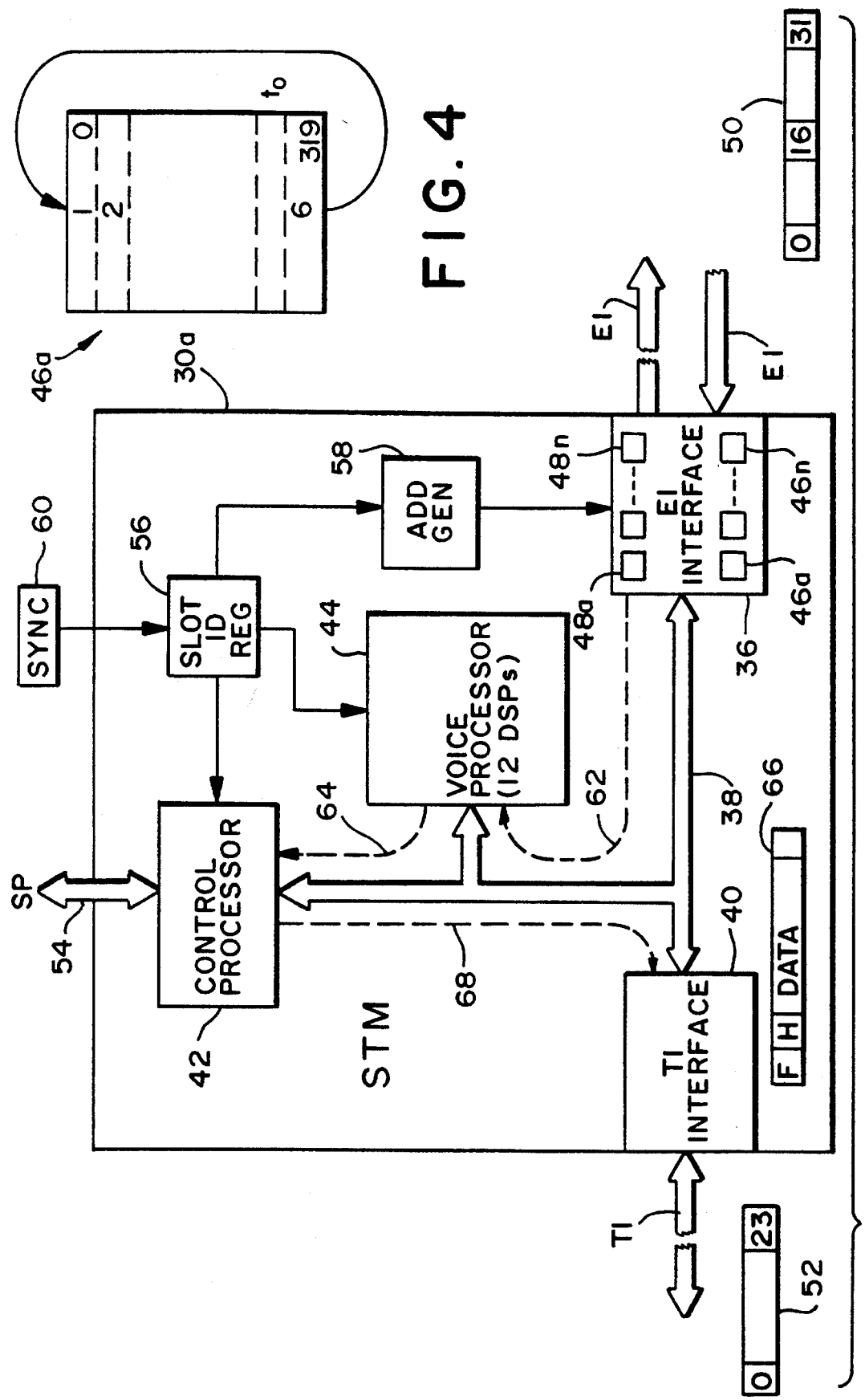

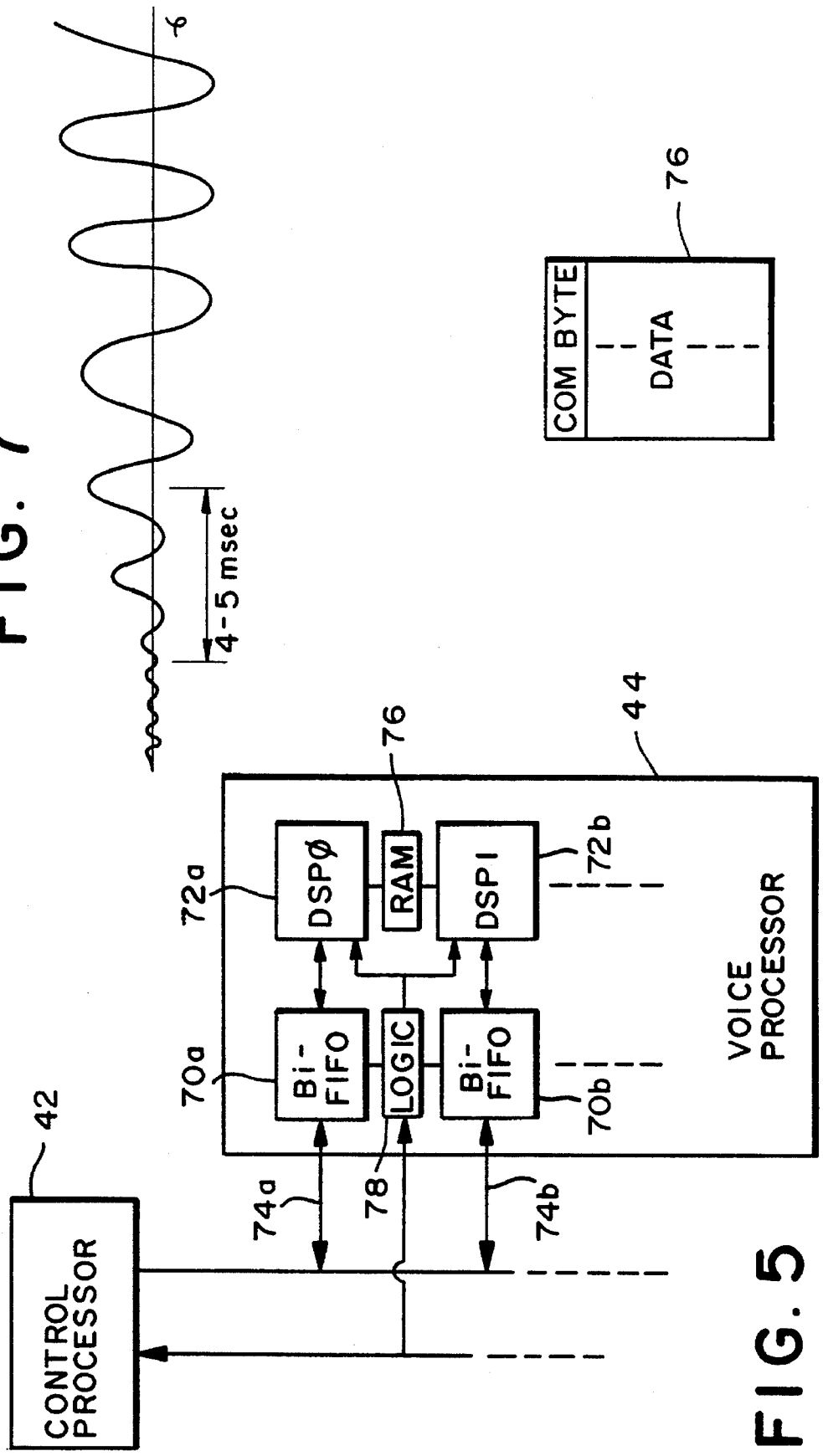

5,526,397

SWITCHING TRANSCODER

FIELD IF THE INVENTION

The present invention relates to a telecommunications network and more particularly to a cellular telecommunications network and a component in the base station controller of the central office of the network for controlling communications between E1 and T1 lines.

BRIEF DESCRIPTION OF THE PRIOR ART

The background of the present invention is given herein by way of FIG. 1. As shown, a cellular telecommunications network, in a very simplistic view, comprises a central office or station 2 to which there are input from a Public Switched Telephone Network (PSTN) 4 a plurality of input lines, otherwise known as standard E1 lines, for connecting a plurality of land-based or fix-based telephones 6 to central office 2. Connected to the output side of central office 2 by way of standard T1 lines 8 are a plurality of Base Transceiver Stations (BTS) 10. Associated with each of the BTSs are corresponding towers 12, for example 12a and 12b connected respectively to BTS 10a and 10b. Mounted on top of the respective towers are antennas through which signals may be transmitted to a mobile telephone, as for example either a stand alone cellular telephone or one that is mounted to car 14. BTS 10 transmits speech signals to car 14 and receives therefrom speech signals to be forwarded to a party the person in car 14 is speaking to, as for example at phone 6a.

To control the transmission of speech signals between the calling/called parties in a cellular communication system, a Mobile Subscriber Controller (MSC) 16 is utilized in central office 2. A Base Station Controller (BSC) 18, the overall operation of which is described in co-pending application Ser. No. 622,232 filed Dec. 6, 1990 and assigned to the same assignee as the instant invention and issued on Mar. 29, 1994, as U.S. Pat. No. 5,299,198, the disclosure of which is incorporated by reference herein, controls the data being transmitted to and from BTSs 10. As should be appreciated by the dotted line enclosed BSC in central office 2, MSC 16 can control a number of BSCs. The number of BSCs and BTSs in the system depends, to a large extent, on the number of subscribers to the system, as for example the number of anticipated mobile phones (mobiles) and the capacity of the system to handle the anticipated calls to be made from the mobiles.

As is well established, speech signals traverse between PSTN 4 and central office 2 at a rate of 64 Kbps via the standard E1 lines 7, while speech signals traverse at a rate of 4 Kbps between BTSs 10 and the mobiles. The reason that a rate of 4 Kbps has been established for speech signals to traverse between the BTSs and the mobiles is due to the fact that the RF bandwidth between towers 12 and mobiles, such as car 14, is very limited, since the FCC has only allocated a very small number of carrier frequencies for mobile communication. Accordingly, each of the carrier frequencies that has been allocated has to be utilized as optimally as possible. Thus, bit rate reduction of an RF speech signal (from 64 Kbps to 4 Kbps) leaves more remaining bandwidth to accommodate a higher number of mobiles. Accordingly, a critical issue the designers of a cellular telecommunications network system confront is to increase the capacity of the system by compressing the speech signals being fed from a PSTN at 64 Kbps to mobiles at 4 Kbps. Conversely, speech signals originated from mobiles have to be decompressed from 4 Kbps to 64 Kbps, Such compression/decompression is known in the industry as "transcoding".

Prior to the instant invention, the transcoders which are necessary to perform compression/decompression are usually situated inside the BTSs. At the same time, the BSC in the central office performs a switching function of matching the appropriate conversation between the different speakers being carried along the respective E1 and T1 lines. For example, BSC 18 in central office 2 has to connect the fix-based speaker whose speech is being carried on, for example line 7a, of the E1 lines to BTS 10a via line 8a of the T1 lines so that he can converse with the mobile speaker in car 14. Such separation of the switching function from the transcoding function was found to lead to an inefficient operation. In other words, to have a transcoder in One module for performing transcoding and a switch in another module for performing switching was found to be suboptimally efficient. This is particularly true with respect to an the E-TDMA system being designed by the assignee where speech clipping and time delay are important factors to be taken into consideration.

Furthermore, in the prior art systems, there is assigned through the entire duration of a call between a fix-based caller and a mobile caller one of the scarce allocated carrier frequencies and certain slots in the frequency. Accordingly, only a very limited number of conversations can take place at any one time.

It is therefore an objective of the present invention to provide for a switch transcoding system that greatly enhances the number of calls which can be carried on at the same time between a plurality of fix-based and mobile speakers.

It is another objective of the present invention to provide an efficient way of switching and transcoding the speech signals traversing between fix-based and mobile speakers.

BRIEF DESCRIPTION OF THE FIGURES

FIG. 3 is a block illustration of the switch transcoder mechanism of the present invention;

FIG. 4 is a simplified illustration of circular buffer used in the E1 interface of the switch transcoder mechanism of FIG. 3;

FIG. 5 is a more detailed block illustration of the voice processor of FIG. 3;

FIG. 6 is a block illustration of a packet of information traversing through the switch transcoder module of FIG. 3;

FIG. 7 is a representative speech signal which is being detected by the voice processor of FIG. 3;

DETAILED DESCRIPTION OF THE PRESENT INVENTION

Figure 1:
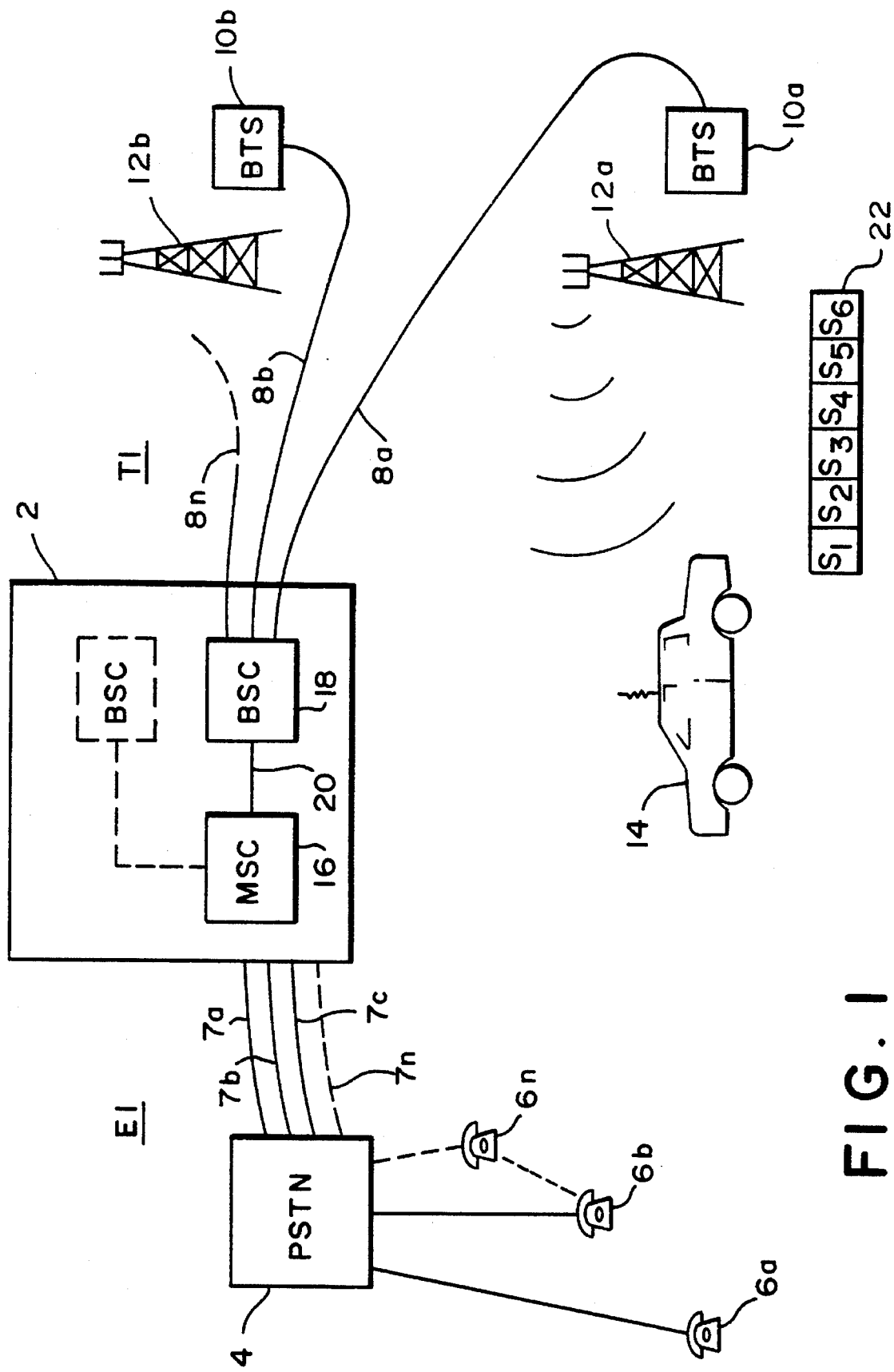
FIG. 1 is a simplified illustration of the different components of a cellular telecommunications system for a discussion of the prior art and an overall view of the system of the present invention.

There are several different architectures for cellular systems. The oldest variant in this country is Advanced Mobile Phone Service (AMPS) which is an analog system in which each half of a conversation is associated with a dedicated carrier frequency and speech signals are frequency modulated onto the dedicated carrier. More recently the dual use IS-54 standard was promulgated. One of the dual approaches of this standard is the AMPS approach. However, the standard also employs digital Time Division Multiplexing (TDMA) which comes in both full rate and half rate coded cases. In either variety the carrier is formatted into a repeating frame structure with six slots in each 40 ms frame. In the full rate coded case each user is allocated two slots per frame for the transmission of digitally encoded speech samples. Full rate coding corresponds to transmitting at a rate of 8 Kbps. in the half rate coded case the user is allocated one slot per frame and in this case the transmission rate is 4 Kbps. The digital portion of the IS-54 standard is similar to AMPS in that each user is allocated a channel (2 slots per frame for full rate coding or 1 slot per frame for half rate coding) on call establishment for the duration of the conversation. It is easy to see that TDMA protocol has an advantage over AMPS of either 3 to 1 (for full rate coding) or 6 to 1 (for half rate coding). The IS-54 standard is dual use since conforming base station equipment operates either in the analog mode (FM like AMPS) or in the digital mode (either half or full rate coded TDMA).

A further variant is the E-TDMA® system incorporated by reference copending application Ser. No. 622,232). E-TDMA system offers additional capacity enhancements by using Digital Speech Interpolation (DSI). In other words, in E-TDMA system a voice channel is only assigned when speech is present for transmission. Well known statistics indicate that speech is present only during 40% of the duration of a conversation so that by using E-TDMA system an improvement of 15 to 1 over AMPS is likely. AMPS requires one carrier for each participant of a conversation, full rate coded TDMA can serve 3 participants with the same bandwidth, half rate coded TDMA can serve 6 participants and E-TDMA system can serve 15 participants.

Using E-TDMA system introduces two complexities into the interface between the mobile and the PSTN. In the first place channel assignments are necessary on initiation of each speech burst rather than only on call set-up as in TDMA. The manner in which channel assignments are made for speech bursts detected at the mobile (reverse channel) is described in co-pending application Ser. No. 622,243 filed Dec. 6, 1990 and assigned to the assignee of this application. The disclosure of the '243 application is incorporated by reference herein. The BSC includes a Voice Activity Detection function for speech detected at the base station, this is used to initiate channel assignments for speech destined for the mobile over a forward channel. In addition, since channels are assigned for the duration of a conversation in TDMA, the relationship between the E1 and T1 slots taking part in a given conversation could be fixed. In E-TDMA, since channels are only assigned during speech, the relationship of E1 and T1 slots taking part in a single conversation will change with the passage of time.

By way of FIG. 1, the environment in which the switch transcoder mechanism of the present invention operates is shown. In particular, as was discussed previously, central office 2 has a Mobile Subscriber Controller MSC 16 which controls a number of Base Station Controllers BSCs 18. Line 7a–7n input to Central Station 2 are standard E1 lines while lines output therefrom, more specifically from BSC 18 as 8a–8n, are the standard T1 lines. The E1 and T1 lines are bi-directional such that signals may bi-directionally traverse between PSTN 4 and BTSs 10.

As is well known, a T1 line is a high speed digital line that is available from various phone companies for transmitting signals at 4 Kbps between BSC 18 and BTSs 10. Speech signals traversing between Central Station 2 and PSTN 4 are carried by the E1 lines at 64 Kbps. Thus, in order to enable a fix-based speaker to converse with a mobile speaker, the speech signals have to be compressed from lines E1 to T1, and decompressed from lines T1 to E1.

The E1 lines to Central Station 2 are routed to MSC 16 and connected via interface lines 20 to BSC 18. Interface lines 20 can be equated the same as the E1 lines and are referred to accordingly. For the present invention system, there is a maximum number of 384 E1 lines connecting MSC 16 and BSC 18. Thus, BSC 18 has an E1 interface with respect to MSC 16. And with the T1 connection to the BTSs 10, BSC 18 also has a T1 interface. In a cellular telecommunications system, there is a need to compress speech coming from PSTN 4 at 64 Kbps via lines E1 to a much lower rate to be transmitted via lines T1 to the BTSs.

With reference to FIG. 1, a BTS and its associated tower, for example 10a and 12a, communicate with a mobile, for example 14, in the form of a speech frame 22 having 6 slots $S_1$–$S_6$. For IS-54 (TDMA) full rate coding, two of these slots, for example $S_1$ and $S_3$, of frame 22 are assigned for the duration of the conversation to a single mobile such that only three mobiles may communicate with corresponding speakers in the carrier frequency that contains frame 22. For the TDMA half rate coding protocol, each of the slots is assigned to a mobile so that 6 mobiles can use the same frame.

Figure 2:
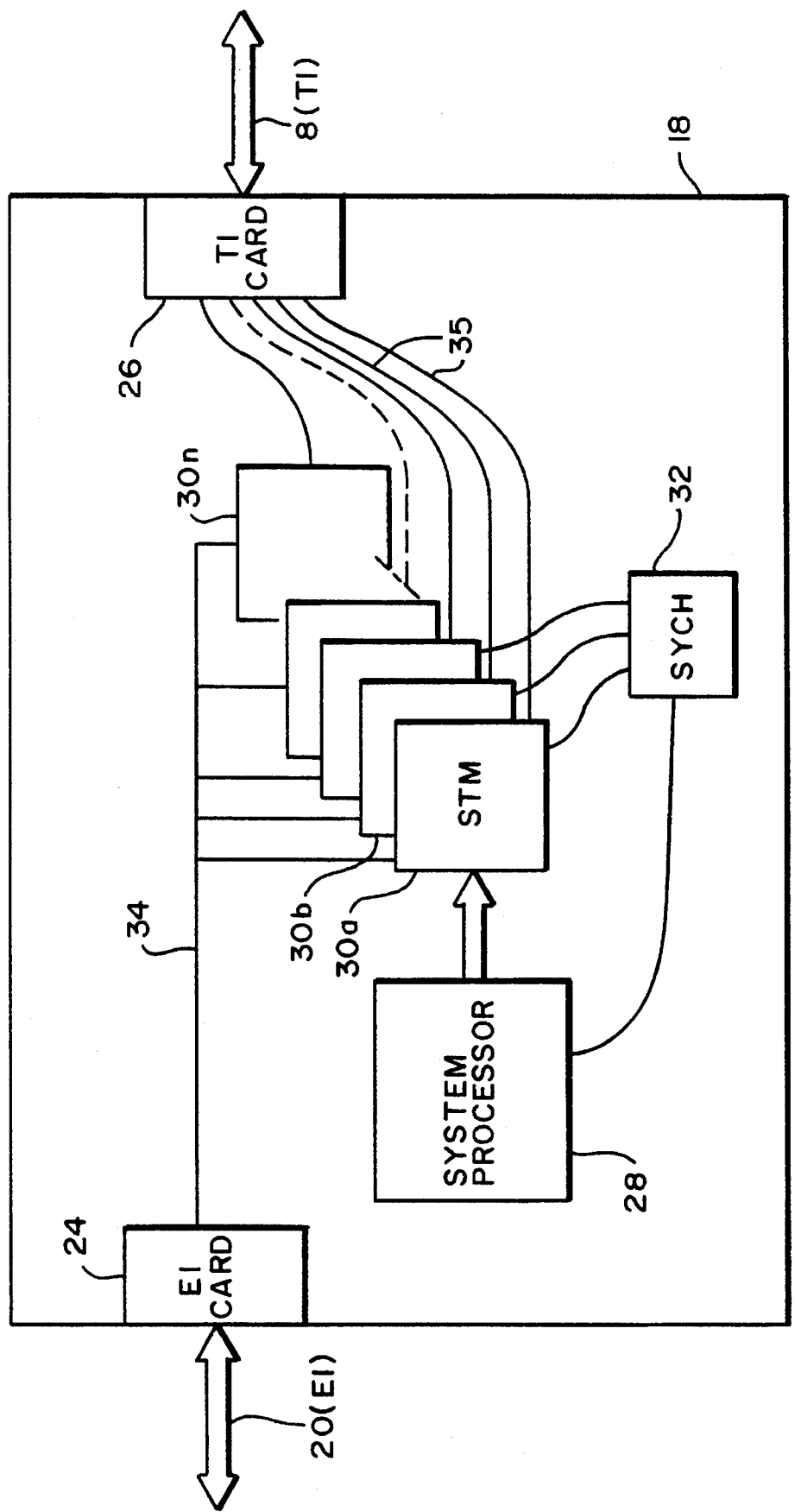
FIG. 2 is a simplified schematic of the base station controller of the present invention.

FIG. 2 is a simplified block illustration of a base station controller, for example BSC 18, resident in central station 2 of FIG. 1. As shown, BSC 18 has 384 E1 circuit lines 20, i.e. the E1 interface lines, provided to E1 cards (E1 card 24) for low logic level interfacing.

T1 cards (T1 card 26) provide low level interfacing with 8 physical T1 lines, designated 8. Since there is a well established one to one redundancy for the T1 lines, in actuality, for all practical purposes, the number of T1 lines connected to T1 card 26 can be considered 4. Also within BSC 18 are a number of system processors which, for the rest of this discussion, is referred to simply as system processor 28. Connected to a common bus (not shown) to be in constant communication with system processor 28 are a plurality of switch transcoder modules STM 30a–30n. There may be up to 21 STMs resident in each of the BSC 18 in central station 2.

Since the cellular telecommunications system is slot-based, a synchronization mechanism 32, for example an oscillator, is required in order to synchronize all of the STM 30s and system processor 28. As shown, the data from the E1 lines, after having been made compatible with BSC 18 by E1 card 24, is fed to each of the STMs via line 34. For the rest of the discussion, line 34 is considered to be the same as lines 20. Also connected to each of the STMs 30 are respective lines 35 which likewise may be considered the same as T1 lines 8, as T1 card 26 performs the same function as E1 card 24 by making the logic level of the data traversing between T1 lines 8 and lines 35 compatible. Each of STMs 30, in addition to transcoding the speech signal (also to be referred to as speech data bursts or speech burst) for each of the slots, also acts as a switch to route the correct speech signals for each conversation through the appropriate E1 and T1 lines. For each of the T1 lines, the present invention system is capable of providing for approximately 240 calls, as compared to the prior art system using TDMA which was only capable of providing for 24 calls per T1 line.

Before delving into the particulars of a representative of one of the STMs, it should be noted that the present invention E-TDMA transcoding method uses digital speech interpolation (DSI). DSI is a well known technique in the field of telecommunications in which digital processors in the system are used to detect whether a sound is uttered. Using DSI in the present invention E-TDMA method, when a sound is detected, that speech sound, otherwise may be referred to as a speech data burst for the detection period, is allocated to a slot in one of the scarce frequencies. When no sound is detected, that slot is freed up and allocated to another speaker. This is possible for E-TDMA because of the fact that, in a normal conversation, a person would only be speaking approximately haft of the time. For the rest of time, for example while that person is listening, the frequency allotted to that person would stay unused. Thus, by detecting the utterance of sounds and by constant switching from slot to slot, a substantially greater number of conversations can be fitted into the same slots of the same frequency. However, in E-TDMA system, there should be a minimal amount of delay from the time a person first starts to speak and when the switch is made from one slot to the next, as to do so would cause a portion of the speech to be lost. Such switching of the different slots of the different frequencies in E-TDMA system is referred to as assigning on a "speech burst" basis. In other words, in order to effect an optimal switch transcoding system, there should be, if at all, only a minimum amount of delay.

FIG. 3 illustrates in block format the different components of a representative STM, for example STM 30a, of the present invention. As shown, STM 30a has an E1 interface 36 which in turn is connected via a multi-line bus 38 to a T1 interface 40. Bus 38 further connects both E1 and T1 interfaces 36, 40 to a control processor 42 and a series of voice processors, referred to as simply voice processor 44 in FIG. 3. Residing in E1 interface 36 are two sets of buffers 46a–46n and 48a–48n. For the FIG. 3 embodiment, there are 384 buffers 46 and a corresponding 384 buffers 48. Buffers 46 may be referred to as input buffers while buffers 48 output buffers. Buffers 48 are used to store speech samples to be transmitted from STM 30a to the E1 lines while buffers 46 are used to store speech samples sent from the E1 lines. For the instant discussion, since buffers 48 are the same as buffers 46 and they both perform the same storage function, only input buffers 46 are described.

To understand why buffers are needed, it should be understood that the data format frame being used on the E1 lines is a so-called "E1 format", a time slot-based format which carries a serial bit stream of data. Such E1 format frame is shown in FIG. 3 as 50 where it can be seen that there are 32 slots, from 0–31, being fed in at a rate 2.048 mbit/s. Therefore, there are 32 voice circuits being carried by each of the E1 lines. For the present invention STM 30a, there are 12 E1 lines provided to input buffers 46 such that each of the 384 buffers 46 has a one to one correspondence with one of the 384 voice circuits (32 voice circuits/frame×12=384). Since the E1 lines are bi-directional, an equal number of output buffers 48 are provided in E1 interface 36.

T1 interface 40 is connected to the T1 line, which is similar to a E1 line except for the fact that it has a bandwidth of 1.0544 mbits/s. Accordingly, the T1 frame, designated 52, has only 24 slots, designated 0–23. It should be noted that both of the E1 and T1 frame formats are well known.

Also residing in STM 30a, as was stated previously, is a bank of voice processors, simply referred to as voice processor 44. Each of the voice processors comprises a digital speech processor (DSP) manufactured by the Texas Instrument Company with manufacturing number TMS 320 C31-33. There are 12 DSPs in voice processors 44. In brief, voice processor 44 can transcode, i.e., compress/decompress, a burst of speech data between different rates, as for example between 64 Kbps at the E1 lines to 4 Kbps at the T1 lines.

Also resident in STM 20a is a control processor 42, which may be an Intel RISC type processor having manufacturing number i80960. In addition to being connected to bus 38, control processor 42 is connected via a bus 54 to a system processor, for example 28 shown in FIG. 2. Also providing an input to control processor 42 is a slot Id register 56 whose function will be described later. Register 56 also has an output connected to voice processor 44 and another output to an address generator 58 whose function of addressing E1 interface 36 is to be described later.

Each of buffers 46 and 48 in E1 interface 36 is a circular buffer and is illustrated, as for example by buffer 46a in FIG. 4. Buffer 46a is meant to receive speech bursts from respective corresponding ones of the 384 voice circuits from the E1 lines. As was noted previously, since it is critical in E-TDMA coding that no part, if at all possible, of a speech be lost, the size of buffer 46a, as are the other buffers, has to be sufficiently large to ensure that a given period of speech is stored therein. For the instant invention buffer, given the fact that each slot has a rate of 2.048 mbits/sec and the E1 line a rate of 64 Kbps, by dividing the former by the latter, a value of 320, which represents the number of bytes is obtained. And since it is known that it takes approximately 125 usec to store one byte of information in buffer 46a, by multiplying 125 with 320, a value of 40 msec is obtained. Accordingly, buffer 46a should have the capacity to store 40 msec of speech.

As shown, the respective bytes of buffer 46a have been designated 0 to 319 for addressing. Further, buffer 46a is divided into 6 slots, from 1–6, each for receiving corresponding speech from its corresponding input E1 voice circuit. Thus, as speech bursts are fed from the input E1 voice circuit, the respective speech bursts are stored, seriatim, in buffer 46a. For example, the first portion of samples would be stored in slot 1 at time $T_0$. At the next time increment $T_1$, samples would be stored in slot 2. The same process is repeated until slot 6 is reached, at time $T_6$. At time $T_7$, the speech samples are loaded into slot 1, thus overwriting the previous speech samples, which are lost. Thus, in order to recover data that was stored, as for example 30 msec before, slot 4 of buffer 46a has to be addressed and the speech samples stored therein retrieved. Other speech bursts residing in other buffers corresponding to different conversations are likewise addressed and retrieved by control processor 42.

The retrieval of all of the stored speech samples for a given period of time is important for E-TDMA transcoding because each burst of a speech is important for reconstructing the speech.

In addition, delay is extremely critical for an E-TDMA coding system. To illustrate, with reference to FIG. 7 which shows a representative speech pattern, it can be seen that it takes approximately 4–5 msec before the fact that a speaker has uttered a sound is detected by the system. For a TDMA system, it is not critical whether the initial 4–5 msec is detected, as slot(s) in a speech frame are allotted to the speaking parties throughout the duration of the conversation. In other words, for a TDMA system, it does not make that much difference whether a tiny portion of the beginning of a conversation is lost. But in the case of an E-TDMA system where the conversation between two speakers is divided into a sequence of speech bursts, it becomes incumbent that no portion of the speech be lost, as such would destroy the integrity of the conversation. Therefore, buffers 46 are used to store the different speech bursts such that none of the data is lost, not even when a sound is not detected by Voice Activity Detection (VAD) until sometime after the beginning of the speech burst. And since there are 384 voice circuits being provided to E1 interface 36, voice processor 44 compresses, at any one given time, 6 of the circuits, i.e. the 6 slots of the T1 format. It should be noted however, in actuality, more than 6 compressions could conceivably take place at any given time since more DSPs may be integrated to the STM.

To address the different slots, and the specific addresses of the respective buffers, address generator 58 is used. In essence, the buffers are made from a plurality of static RAMs, for example a RAM having a dimension of 128 kilobyte by 8 bytes. The addressing of such memory devices by conventional address generators, such as 58, are well known and will not be further discussed herein. To assure that the correct buffer is addressed, synchronization is provided by a timing means 60 which provides synchronization pulses to Slot ID register 56, which in turn synchronizes address generator 58, voice processor 44 and control processor 42.

With reference to the circular buffers, it should be noted that there is a one-to-one correspondence between a voice circuit (speaker) and a circular buffer, and furthermore, during a speech burst, there is a one-to-one correspondence between a circular buffer and a slot on a carrier frequency to a mobile. Thus, the different speech bursts will jump from different frequencies and slots all the time. However, the speech bursts from the same conversation would be stored in the same buffer.

Control processor 42 keeps track of the different speech bursts relating to the utterances of a speaker in sequence in order to differentiate that speakers utterances from other speakers'. The different speech bursts are fed sequentially to voice processor 44 for transcoding. To keep tab of the different speech bursts, the system processor of the central office maintains a table chart (not shown) that tracks the different frequencies and slots of the respective speech bursts from the speaker so that the system processor can notify the STM control processor, for example 42, of the frequency and slot assignments. STM control processor 42 then controls the switching function, i.e. connecting any one of the E1 lines to any one of the T1 lines.

In operation, control processor 42, upon receiving instructions from the system processor, detects the arrival of a speech burst to a particular one of buffers 46 in E1 interface 36 by appropriate addressing. Control processor 42 next retrieves that particular speech burst, which is part of the conversation being carried on between a fix-based party and a mobile one, and routes the same to voice processor 44. Successive speech bursts of the same conversation are likewise sequentially retrieved and routed to voice processor 44 where transcoding is effected to compress the incoming speech from 64 Kbps to 4 Kbps. Such retrieval and routing of successive speech bursts is indicated by the dotted line 62. It should be noted that in a BSC with multiple STMs (which is the typical case) one conversation may be transcoded by different STMs at different times. For example, the first speech burst may be transcoded by STM A, while the second by STM B.

After compression, the now 4 Kbps speech bursts, commonly referred to at this point as speech spurts, are retrieved by control processor 42 from voice processor 44 and routed, via dotted line 64, to control processor 42 for processing into a High Level Data Link Control Frame (HDLC), designated 66. Such HDLC frame is well known and is comprised of, for example, a flag byte F and a header byte H for its first two bytes. The middle of the HDLC frame is used to store data. Such HDLC frame is then routed by control processor 42 via dotted line 68 to T1 interface 40, and is subsequently provided to T1 line. As was stated previously, the T1 frame being provided at the T1 lines is one that has 24 slots, as indicated by 52, and having a rate of 1.0544 mbit/sec.

With reference to FIG. 5, voice processor 44, which in actuality comprises a number of speech processors, is described. As shown, voice processor 44 has a plurality of bi-directional First In First Out Buffers Bi-FIFOs 70. Connected to each of the Bi-FIFOs is a Digital Signal Processor DSP 72. As was noted, the DSPs are conventional processors having manufacturing number TMS 320C31-33. For the present invention embodiment there are 12 DSPs, with 12 corresponding Bi-FIFOs in voice processor 44. Two of the DSPs, along with their corresponding Bi-FIFOs, work as a pair for compressing/decompressing the speech bursts retrieved by controller 42 and fed to voice processor 44 via lines 74. It should be noted that lines 74 are a part of the earlier discussed bus 38 in FIG. 3. There is connected to each pair of DSPs a shared RAM 76 which provides a memory for possibly storing the different instructions and algorithms for the DSPs to transcode the received speech data bursts. The actual algorithms and instructions for transcoding is described in a co-pending application by Wang et al., having Ser. No. 434,096, filed May 3, 1995, which is a continuation of application Ser. No. 970,447, field Nov. 2, 1992, now abandoned, and which is also assigned to the same assignee as the instant invention.

Another component of voice processor 44 is a logic 78 whose function is to control the operations of the respective DSPs 72a and 72b such that those processors' operations do not conflict.

In operation, when control processor 42 gives voice processor 44, specifically DSP 72a and 72b, a command and provides the retrieved speech bursts thereto, the DSPs will process that command with the received bursts and return a response along with the transcoded data via either lines 74a or 74b. Thus, the DSPs operate synchronously, as slaves to control processor 42.

The interfacing between control processor 42 and voice processor 44 can be illustrated with reference to FIG. 6 which shows, for purposes of discussion, a packet of information to be provided to voice processor 44. As shown, the information packet 76, which represents a speech burst, has a first command byte, followed by data. The command byte provides information to voice processor 44 as to the type of operation to be performed. There are for the present invention, for example, at least three different types of operations: compression, decompression, and voice activity detection.

Compression and decompression, as have been discussed previously, deal with the compressing and decompressing of speech. Voice Activity Detection (VAD) deals with the discussion relative to FIG. 7 for detecting the beginning of an utterance. Such VAD may be achieved by voice processor 44 due to the excess capacity voice processor 44 has. But since VAD does not in itself form an integral part of the present invention, it will not be further discussed.

As was noted earlier with respect to FIG. 3, there are 12 DSPs 72 in voice processor 44 for handling six simultaneous conversations, as the DSPs work in pairs. Corresponding additional logic circuits such as logic 78 are also present for providing the hand-shaking that is necessary for communication link between control processor 42 and the respective DSPs 72.

In operation, again describing only a compressing function, the information from the E1 lines is fed to buffers 46. See FIG. 3. Each one of buffers 46 is addressed, via Address Generator 58, by control processor 42. And according to the commands given to it from the system processor, control processor 42 retrieves the of interest speech from the addressed E1 interface buffer 46 and provides the retrieved speech to the DSPs via the corresponding Bi-FIFOs in voice processor 44.

Figure 8:
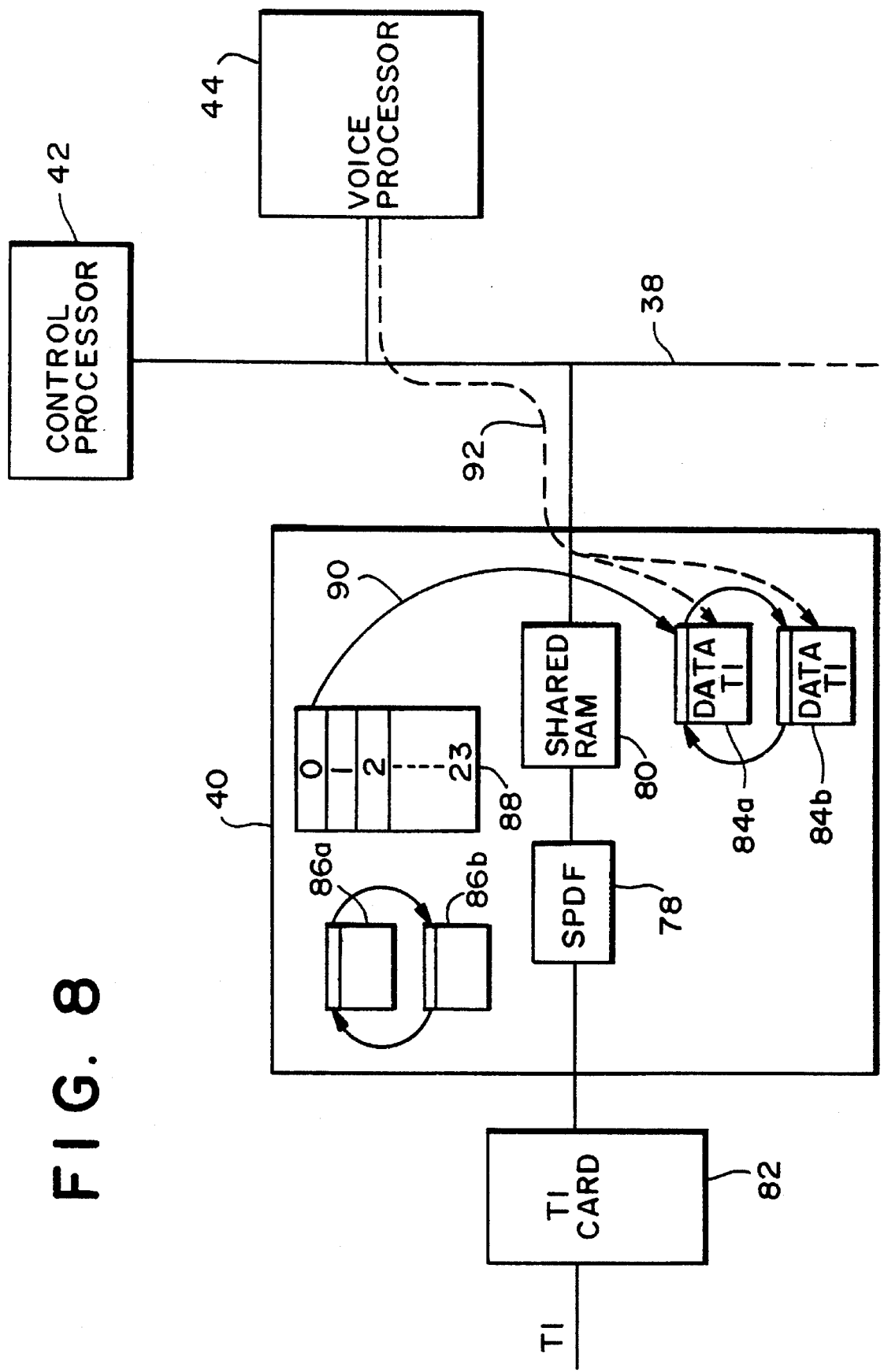
FIG. 8 is a simplified block illustration of the T1 interface of the FIG. 3 switch transcoding module.

FIG. 8 shows in detail the T1 interface 40 shown in FIG. 3. As shown, T1 interface 40 has a Synchronizing Protocol Data Framer (SPDF) 78 connected to a shared RAM 80. SPDF 78 is connected to a T1 card 82 whose function is to provide an electrical interface which converts basic TTL logic level to T1 level for transmitting and receiving speech signals to/from the BTS. RAM 80 sets up T1 interface in accordance with the specification required for the T1 lines under the established T1 standards. SPDF 78 generates the frame onto which information is provided to T1 interface 40 by control processor by reading the requirements from RAM 80 and creating link list buffers whose data are to be sent to the T1 line via T1 card 82. Such buffers are illustrated by buffers 84 and 86, with each set of buffers connected to form looped buffers.

There is also residing in T1 interface 40 a table 88 which contains the different time slots for each of the time slots 0–23 for the T1 format frame. Each of the slots points to one set of loop buffers, as for example slot 0 of table 88 pointing to buffers 84a and 84b via line 90. Accordingly, the sequence of data to be inserted to the T1 line and when to retrieve the speech spurt from voice processor 44 via dotted line 92 to buffers 84a and 84b are known. The controlled routing of the data in the different slots of table 88 to the different sets of buffers in T1 interface 40 is effected by control processor 42 through bus 38.

Since there are only 24 slots in the T1 format frame, there are very few buffers, when compared with the number of E1 interface buffers, resident in T1 interface. Accordingly, the different sets of buffers, 84, 86 etc. can be carved out of a single conventional 64 Kbyte RAM.

In sum, for a STM module, as for example STM 30a shown in FIG. 3, both the voice processing and switching functions are performed by components, or a combination of components, located on the same module. Consequently, the time delay for processing becomes quite small as compared to the prior art method of performing the transcoding at the Base Transceiver Station and switching at the Base Station Controller. Furthermore, with the T1 interface being on the same STM module, a multiple number of STMs could be used for the same T1 line. For the ETDMA system, assuming that only 21 frequencies are assigned to the cellular network, 21 STM modules may reside in each of the BSCs 18 in central office 2.

Given the fact that each of the STMs would handle one of the frequencies, in theory, only two sets of buffers are required in the respective T1 interfaces of the corresponding STM. However, for the sake of adaptability, there are more than four sets of buffers located in each one of the T1 interfaces. It should be noted that these buffers are different from the loop buffers connected to table 88 shown in FIG. 8. The buffers being discussed herein are required to allow both analog Pulse Code Modulated (PCM) and TDMA speech signals to traverse between the E1 and T1 lines. This is done so a STM can handle both digital and analog frequencies. Furthermore, inasmuch as most of the cellular systems currently in operation operate under the analog PCM coding, the present invention STM would directly relay the analog PCM signals from the E1 lines to the T1 line. There is no manipulation by either controller processor 42 or voice processor 44 since no compression/decompression is needed for those analog PCM signals. Thus, the present invention switch transcoder system is adaptable to analog PCM, TDMA and E-TDMA operations.

Figure 9:
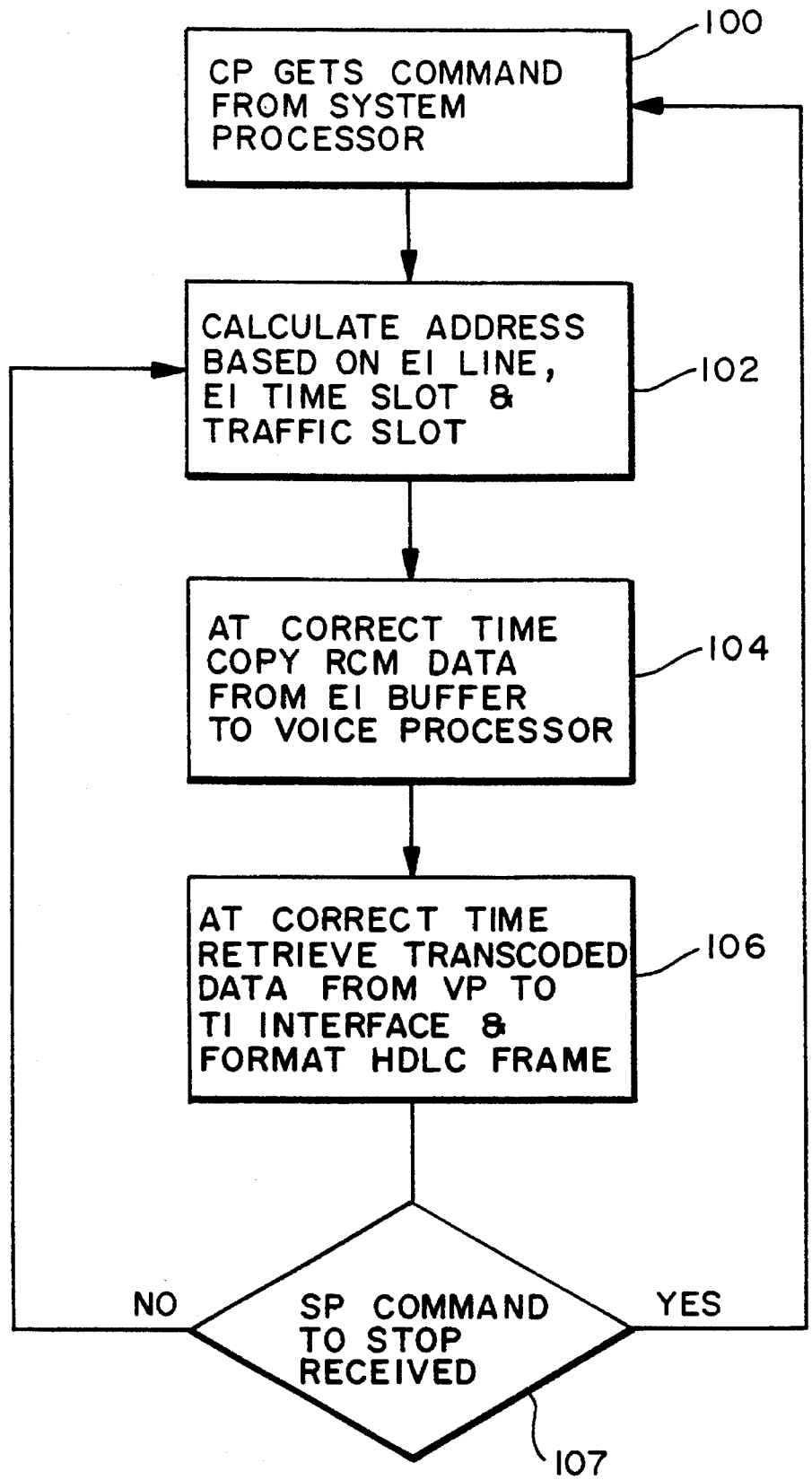
FIG. 9 is a flow diagram of the steps taken by the switch transcoder module of FIG. 3 for compression transcoding.
Figure 10:
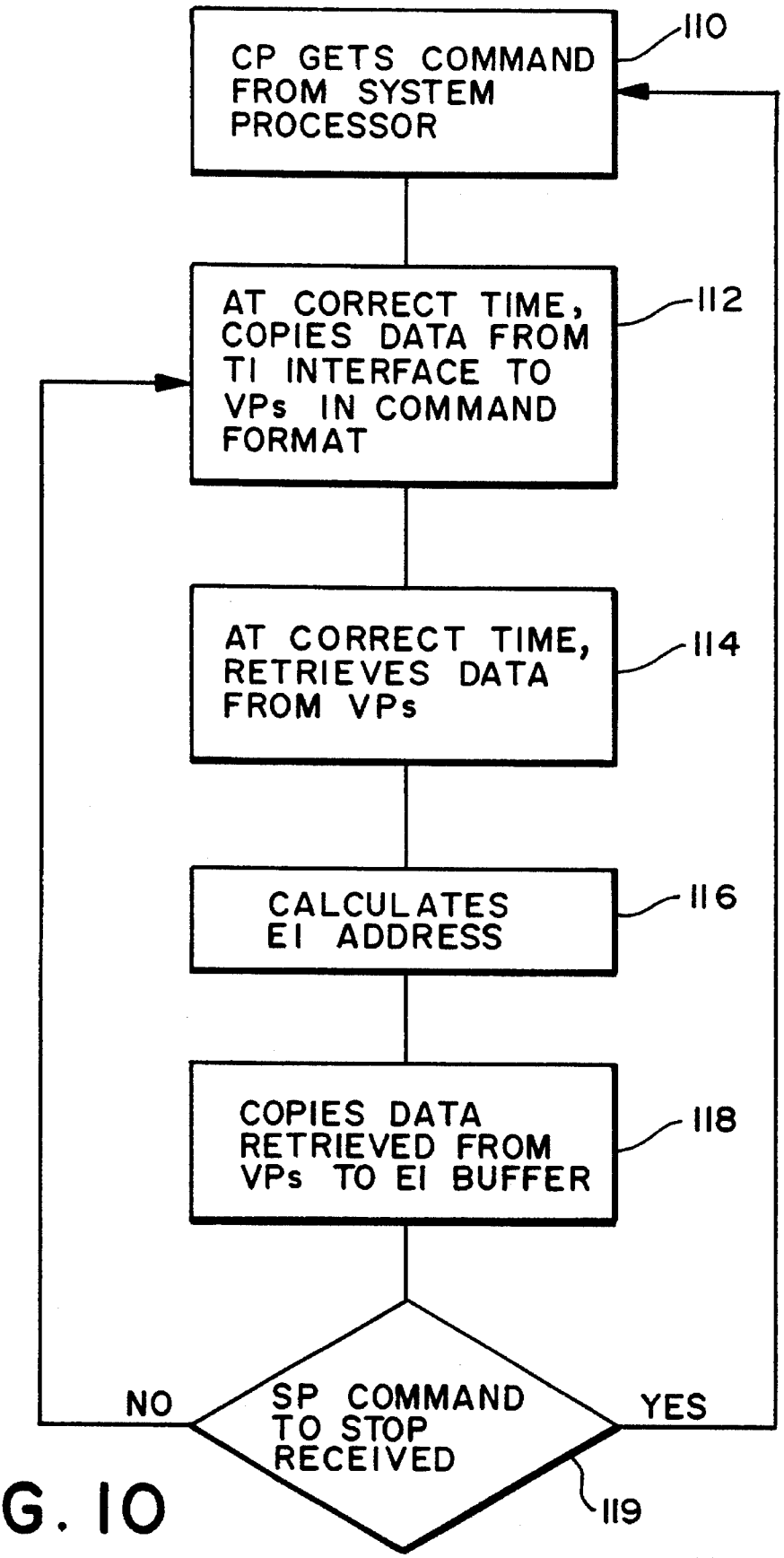
FIG. 10 is a flow diagram of the steps undertaken by the switch transcoder module of FIG. 3 in performing decompression transcoding.

FIGS. 9 and 10 are respective flow charts illustrating the operation, from the perspective of control processor 42, of compressing and decompressing speech in accordance with the switch transcoder of the present invention system.

As illustrated in FIG. 9, assume data is being automatically loaded into the different E1 interface buffers 46 continuously from the E1 lines. When a compression operation is requested, the system controller sends out a compression command to processor 42, as shown in block 100. The system processor command has the following information: the type of E1 line, the E1 time slot, the T1 line to which the information is to be routed, the T1 time slot and the traffic slot (which refers to slots 1–6 illustrated by 22 in FIG. 1 ). Upon receiving the compression command, control processor 42 calculates the address of a particular buffer 46 based on the E1 line, E1 time slot and traffic slot information in block 102. Once the appropriate E1 interface buffer 46 is addressed, at the appropriate time, i.e. at the correct traffic slot in accordance with slot ID register 56 (see FIG. 3), a copy of the input speech from the addressed buffer is sent to voice processor 44 in the appropriate command format, per FIG. 6, in block 104. At the correct time, which may be five slots later, the now compressed speech spurt is retrieved from voice processor 44 and sent to T1 interface 40 in the appropriate HDLC frame format in block 106. Thereafter, the properly formatted data is sent to the appropriate T1 line. If a command is then received from the system processor to stop, control processor 42 would stop operation and wait for the next command from the system processor, per decision block 107. Otherwise, operation is returned to block 102.

FIG. 10 illustrates the steps of decompressing speech, which is the reverse flow of the steps illustrated in the FIG. 9 flow chart.

Starting with block 110, control processor 42 gets the decompression command from the system processor. Thereafter, at the correct time, the data provided from the T1 line to T1 interface 40 is input to voice processor 44 in block 112. In block 114, the appropriately transcoded data is retrieved one slot later from voice processor 44. Control processor 42 then calculates the E1 address in block 116. After which a copy of the data retrieved from voice processor 44 is transmitted to the appropriate E1 interface output buffers 48 and output to the appropriate E1 line in block 118. A decision is made in block 119 on whether a command is received from the system processor to stop the decompressing operation. If yes, operation returns to block 110. If no, operation is routed to block 112.

While a preferred embodiment of the invention has been disclosed for purposes of explanation, numerous changes, modifications, variations, substitutes, and equivalents, in whole or in part, will now be apparent to those skilled in the art to which the invention pertains. Accordingly, it is intended that the invention be limited only by the spirit and scope of the appended claims.

I claim:

1. Switching transcoder for a radio transceiver station, the transceiver station supporting a plurality of different voice channels in which voice in each channel is divided into speech bursts, each channel corresponding to a different voice source, the switching transcoder comprising:

memory means for storing a plurality of different speech bursts associated with different voice channels in different areas thereof the memory means comprising a plurality of buffers each representative of a different area of said memory means for storing speech bursts relating to a corresponding one of said voice channels for a predetermined period of time;

voice processor means for transcoding speech bursts;

control processor means for retrieving speech bursts located at different areas of said memory means corresponding to respective ones of said voice channels and routing said retrieved speech bursts to said voice processor means for transcoding.

2. Switching transcoder of claim 1, further comprising:

means for synchronizing the operation of said voice and control processor means.

3. Switching transcoder of claim 1, wherein said voice processor means comprises a plurality of digital signal processors working in pairs with corresponding pairs of bidirectional buffers for transcoding said retrieved speech bursts by compressing the speech bursts corresponding to one voice source and decompressing the speech bursts corresponding to another voice source.

4. Switching transcoder of claim 1, wherein said memory means comprises a plurality of input buffers corresponding to the number of voice channels supported by the transcoder each for storing speech bursts from a corresponding one of said supported voice channels; and a plurality of output buffers corresponding to the number of said supported voice channels each for storing transcoded speech bursts to be provided to a corresponding one of said supported voice channels.

5. In a radio transceiver station having a plurality of first voice lines and a plurality of second voice lines, said station providing communication channels for a plurality of voice sources, a first voice source producing speech bursts for communication through one of said first voice lines and a second voice source producing speech bursts for communication through one of said second voice lines, the station including a switching transcoder comprising:

a plurality of first buffers each connected to a corresponding one of said first voice lines, speech bursts from said first voice source being stored in one of said first buffers;

voice processor means for transcoding speech bursts provided thereto;

control processor means for addressing said first buffers and retrieving from said one first buffer only the speech bursts uttered by said first voice source, and routing the retrieved speech bursts to said voice processor means for transcoding.

6. Switching transcoder of claim 5, further comprising:

an interface to which said second voice source is communicatively connected, said control processor means further routing the retrieved speech bursts after transcoding by said voice processor means from said voice processor means to said interface to thereby establish communication between said first and second voice sources.

7. Switching transcoder of claim 6, wherein said switching transcoder comprises a plurality of second buffers each connected to a corresponding one of said first voice lines, one of said second buffers storing the speech bursts from said second speaker that have been transcoded by said voice processor means, said control processor means retrieving from said one second buffer only the transcoded speech bursts from said second voice source and routing the same to said first voice source.

8. Switching transcoder of claim 7, wherein said voice processor means comprises a plurality of digital signal processors working in pairs with corresponding pairs of bidirectional buffers to transcode the speech bursts from said first and voice sources.

9. Switching transcoder of claim 6, wherein said interface comprises a plurality of output buffers working in pairs for storing the transcoded speech bursts from said first voice source to said second voice lines, the number of said output buffers being substantially less than the number of either of said first or second buffers.

10. A method of transmitting a conversation between a first voice source and a second voice source in a radio telecommunication network wherein said first and second voice sources produce speech bursts, the method comprising the steps of:

storing speech bursts uttered by said first voice source in a corresponding one of a plurality of buffers;

retrieving the stored speech bursts relating to said first voice source from said one buffer and providing said retrieved speech bursts to a voice processor means; transcoding said provided speech bursts; and retrieving the transcoded speech bursts relating to said first voice source from said voice processor means and providing said retrieved transcoded speech bursts to said second speaker.

11. Switching transcoder module for a voice communications transceiver station having a plurality of input voice lines to the module and a plurality of output voice lines from the module, the input and output voice lines carrying speech bursts to and from the module respectively, the module comprising:

a first plurality of buffers coupled to the input voice lines for storing speech bursts carried by the input voice lines;

a second plurality of buffers coupled to the output voice lines for storing speech bursts carried by the output voice lines;

a voice processor for transcoding speech bursts;

a control processor for routing speech bursts stored in the first plurality of buffers to the voice processor for transcoding and for routing speech bursts that have been transcoded to the second plurality of buffers to establish a connection between a specific one of the input voice lines from among the plurality of input voice lines with a specific one of the output voice lines from among the plurality of output voice lines.

12. Switching transcoder of claim 11 wherein the buffers of the first plurality of buffers are each associated with specific ones of the input voice lines and wherein the buffers of the second plurality of buffers are each associated with specific ones of the output voice lines.

13. Switching transcoder of claim 12 further comprising an address generator and wherein the control processor retrieves speech bursts corresponding to a specific one of the input voice lines by applying addresses from the address generator to the corresponding buffer and then provides the retrieved speech bursts to the voice processor.

14. Switching transcoder of claim 11 wherein the control processor routes speech bursts by retrieving speech bursts from a buffer and then applying the retrieved speech bursts to the voice processor.

15. Switching transcoder of claim 11 wherein the control processor routes speech bursts by retrieving speech bursts from the voice processor and then applying the retrieved speech bursts to a buffer of the second plurality of buffers.

16. Switching transcoder of claim 11 wherein the input voice lines comprise sequentially repeating slots of a time division multiplexed frame, each slot corresponding to a different speech burst, wherein the buffers of the first plurality of buffers are each associated with a repeating slot of the frame for storing the speech burst carried in the associated slot and wherein the speech bursts stored in said buffers are replaced by different speech bursts carried in sequentially repeating ones of the corresponding repeating slots.

17. Switching transcoder of claim 16 wherein the first plurality of buffers comprises at least twice as many buffers as input voice lines and wherein the speech bursts stored in the buffers are replaced by different speech bursts with every other sequentially repeating frame.

* * * * *